(12) United States Patent
Unkle et al.

(10) Patent No.: US 7,100,084 B2
(45) Date of Patent: *Aug. 29, 2006

(54) METHOD AND APPARATUS FOR DIAGNOSING DIFFICULT TO DIAGNOSE FAULTS IN A COMPLEX SYSTEM

(75) Inventors: C. Richard Unkle, Fairview, PA (US); Nicholas Edward Roddy, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 397 days.

This patent is subject to a terminal disclaimer.

(21) Appl. No.: 10/649,513

(22) Filed: Aug. 26, 2003

(65) Prior Publication Data

US 2004/0073844 A1 Apr. 15, 2004

Related U.S. Application Data

(63) Continuation of application No. 09/609,469, filed on Jul. 3, 2000, now Pat. No. 6,615,367.

(60) Provisional application No. 60/162,045, filed on Oct. 28, 1999.

(51) Int. Cl.
*G06F 11/00* (2006.01)

(52) U.S. Cl. .......................... 714/26; 714/37

(58) Field of Classification Search ............. 714/26, 714/37; 700/49; 706/46
See application file for complete search history.

(56) References Cited

U.S. PATENT DOCUMENTS

| | | | |
|---|---|---|---|
| 4,258,421 A | 3/1981 | Juhasz et al. | |
| 4,270,174 A | 5/1981 | Karlin et al. | |
| 4,463,418 A | 7/1984 | O'Quin, II et al. | |
| 4,517,468 A | 5/1985 | Kemper et al. | |
| 4,695,946 A | 9/1987 | Andreasen et al. | |
| 4,823,914 A | 4/1989 | McKinney et al. | |
| 4,970,725 A | 11/1990 | McEnroe et al. | |
| 4,977,390 A | 12/1990 | Saylor et al. | |
| 5,107,500 A | 4/1992 | Wakamoto et al. | |
| 5,113,489 A | 5/1992 | Cihiwsky et al. | |
| 5,123,017 A | 6/1992 | Simpkins et al. | |
| 5,274,572 A | 12/1993 | O'Neill et al. | |
| 5,282,127 A | 1/1994 | Mii | |
| 5,321,837 A | 6/1994 | Daniel et al. | |
| 5,329,465 A | 7/1994 | Arcella et al. | |
| 5,400,018 A | 3/1995 | Scholl et al. | |
| 5,442,553 A | 8/1995 | Parrillo | |
| 5,445,347 A | 8/1995 | Ng | |

(Continued)

OTHER PUBLICATIONS

Trobec, Roman, et al; Optimization of Diagnostic Examination; University of Ljubljana, Jozef Stefan Institute, Ljubljana, Slovenia.

(Continued)

*Primary Examiner*—Scott Baderman
*Assistant Examiner*—Joshua Lohn
(74) *Attorney, Agent, or Firm*—John L. DeAngelis, Jr., Esq.; Beusse Wolter Sanks Mora & Maire, P.A.

(57) ABSTRACT

A method and apparatus for determining the root cause of no trouble found events in a machine is disclosed. The actual faults occurring during a predetermined time interval prior to the no trouble found event are analyzed and correlated with the no trouble found events in an effort to identify those actual faults that have a high correlation with each no trouble found event. If a high correlation is not found, then the no trouble found event is analyzed off-line to determine the root cause.

16 Claims, 9 Drawing Sheets

U.S. PATENT DOCUMENTS

| | | |
|---|---|---|
| 5,463,768 A | 10/1995 | Cuddihy et al. |
| 5,508,941 A | 4/1996 | Leplingard et al. |
| 5,528,499 A | 6/1996 | Hagenbuch |
| 5,528,516 A | 6/1996 | Yemini et al. |
| 5,544,308 A * | 8/1996 | Giordano et al. ............. 714/26 |
| 5,594,663 A | 1/1997 | Messaros et al. |
| 5,631,832 A | 5/1997 | Hagenbuch |
| 5,633,628 A | 5/1997 | Denny et al. |
| 5,638,296 A | 6/1997 | Johnson et al. |
| 5,650,928 A | 7/1997 | Hagenbuch |
| 5,650,930 A | 7/1997 | Hagenbuch |
| 5,661,668 A | 8/1997 | Yemini et al. |
| 5,666,534 A | 9/1997 | Gilbert et al. |
| 5,678,002 A | 10/1997 | Fawcett et al. |
| 5,713,075 A | 1/1998 | Threadgill et al. |
| 5,742,915 A | 4/1998 | Stafford |
| 5,809,161 A | 9/1998 | Auty et al. |
| 5,842,125 A | 11/1998 | Modzelesky et al. |
| 5,845,272 A | 12/1998 | Morjaria et al. |
| 5,884,073 A | 3/1999 | Dent |
| 5,884,202 A | 3/1999 | Arjomand |
| 5,926,745 A | 7/1999 | Threadgill et al. |
| 5,949,345 A | 9/1999 | Beckert et al. |
| 5,950,147 A | 9/1999 | Sarangapani et al. |
| 5,988,645 A | 11/1999 | Downing |
| 6,012,152 A | 1/2000 | Douik et al. |
| 6,028,537 A | 2/2000 | Suman et al. |
| 6,058,307 A | 5/2000 | Garner |
| 6,094,609 A | 7/2000 | Arjomand |
| 6,104,988 A | 8/2000 | Klarer |
| 6,112,085 A | 8/2000 | Garner et al. |
| 6,161,071 A | 12/2000 | Shuman et al. |
| 6,169,943 B1 | 1/2001 | Simon et al. |
| 6,324,659 B1 | 11/2001 | Pierro |
| 6,338,152 B1 | 1/2002 | Fera et al. |
| 6,343,236 B1 | 1/2002 | Gibson et al. |
| 6,415,395 B1 | 7/2002 | Varma et al. |
| 6,513,025 B1 | 1/2003 | Rosen |

OTHER PUBLICATIONS

Johnson, Daniela; Data-Tronic Gas Turbine Information and Control System; 1981; Schenectady, New York, USA.

* cited by examiner

FIG. 1

| CUST | UNIT | DATE | CODE | DESC | DESCRIPTION | FAILMODE_DESC | SUB_ASSEMBLY_CODE | MAIN_ASSEMBLY_CODE |
|---|---|---|---|---|---|---|---|---|
| RR | 3500 | SUN JUL 13 1997 | 1111 | PIPING FITTINGS - ENGINE INTERCOOLER | REPAIRED WATER LEAK AT TOP OF RT | LEAKING FLUIDAIR | ENGINTCOOL | ENGINE |
| RR | 3500 | TUE JUL 01 1997 | 2222 | LUBE OIL - ENGINE | WATER IN LUBE OIL CHANGED OIL | CONTAMINATED | LUBEOIL | ENGISUPT |
| RR | 3500 | SAT JUN 28 1997 | 3333 | BRP - BATTERY CHARGER REGULATOR PANEL | NO BATTCHARGE-REPL BRP | UNKNOWNUNDETERMI | POWERPANEL | POWERELN |
| RR | 3500 | WED JUN 18 1997 | 4444 | EFI-HIGH PRESSURE PUMP | REPLACE 3 HP PUMPS FOR NOT FIRING | UNKNOWN UNDETERMI | ENGFUELINJ | ENGINE |
| RR | 3500 | MON JUN 09 1997 | 5555 | TURBOCHARGER ASSEMBLY-GENERAL - ENG | TURBO DRAGSSECONDARY DAMAGE-RPL | UNKNOWN UNDETERMI | ENGTURBO | ENGINE |
| RR | 3500 | SAT MAY 24 1997 | 6666 | CYLINDER ASSEMBLY - GENERAL - ENG | REPL R6 PA FOR SECONDARY DAMAGE | UNKNOWN UNDETERMI | POWERASSY | ENGINE |
| RR | 3500 | SAT MAY 24 1997 | 7777 | CYLINDER ASSEMBLY - GENERAL - ENG | TRIPPING COP PISTON FAILURE CO | UNKNOWN UNDETERMI | POWERASSY | ENGINE |

*FIG. 2*

| 42 | 44 | 45 | 46 | 47 | 48 | | | | | | | | | | | 49 | | 50 |
|---|---|---|---|---|---|---|---|---|---|---|---|---|---|---|---|---|---|---|
| RR | 3500 | 03-MAY-1997 | 1000 | 90623.06 | 90637.20 | 0.0 | C S | 0 | 1 | 2 | 0 | 101 | 97 | R E 0 0 | | | | INTAKE MANIFOLD AIR TOO |
| RR | 3500 | 03-MAY-1997 | 2000 | 90623.06 | 90637.20 | 0.0 | C S | 0 | 1 | 2 | 0 | 101 | 97 | R E 0 0 | | | | INTAKE MANIFOLD AIR TOO |
| RR | 3500 | 22-MAY-1997 | 3000 | 91067.93 | 91067.93 | 11.4 | F 5 | 992 | 288 | 4706 | 202 | 177 | 182 | M E F 0 | | | 6 AB_M_S_ | COP TRIP |
| RR | 3500 | 22-MAY-1997 | 4000 | 91067.93 | 91067.93 | 11.4 | F 5 | 992 | 288 | 4706 | 202 | 177 | 182 | M E F 0 | | | 6 AB_M_S_ | COP TRIP |
| RR | 3500 | 22-MAY-1997 | 5000 | 91068.70 | 91068.71 | 16.5 | F 4 | 885 | 338 | 2864 | 133 | 175 | 186 | M E 2 4 | | | 6 AB_M_S_ | COP TRIP |
| RR | 3500 | 22-MAY-1997 | 6000 | 91068.70 | 91068.71 | 16.5 | F 4 | 885 | 338 | 2864 | 133 | 175 | 186 | M E 2 4 | | | 6 AB_M_S_ | COP TRIP |
| RR | 3500 | 22-MAY-1997 | 7000 | 91068.71 | 0.00 | 17.9 | F 1 | 458 | 6 | 0 | 0 | 174 | 186 | R E F 4 | | E AB | | FAULT RESET WHILE IN LC |
| RR | 3500 | 22-MAY-1997 | 8000 | 91068.71 | 0.00 | 17.9 | F 1 | 458 | 6 | 0 | 0 | 174 | 186 | R E F 4 | | E AB | | FAULT RESET WHILE IN LC |
| RR | 3500 | 22-MAY-1997 | 9000 | 91069.55 | 91069.55 | 23.1 | F 5 | 992 | 474 | 3005 | 148 | 180 | 187 | M E 2 0 R | | | 6 AB_M_S_ | COP TRIP |
| RR | 3500 | 22-MAY-1997 | 1111 | 91069.55 | 91069.55 | 23.1 | F 5 | 992 | 474 | 3005 | 148 | 180 | 187 | M E 2 0 R | | | 6 AB_M_S_ | COP TRIP |
| RR | 3500 | 22-MAY-1997 | 2222 | 91069.56 | 91069.58 | 27.4 | F 6 | 1010 | 506 | 2405 | 128 | 179 | 189 | M E F 4 | | | 6 AB_M_S_ | COP TRIP |

| 98 | 99 |
|------|----|
| 7311 | 24 |
| 728F | 2  |
| 76D5 | 1  |
| 720F | 1  |

FIG. 6

| CLUSTER NUMBER | FAULT |
|---|---|
| 1 | 7311 |
| 2 | 728F |
| 3 | 76D5 |
| 4 | 720F |

FIG. 7A

| CLUSTER NUMBER | FAULTS | |
|---|---|---|
| 5  | 76D5 | 7311 |
| 6  | 76D5 | 728F |
| 7  | 76D5 | 720F |
| 8  | 7311 | 728F |
| 9  | 7311 | 720F |
| 10 | 728F | 720F |

FIG. 7B

| CLUSTER NUMBER | FAULTS | | |
|---|---|---|---|
| 11 | 76D5 | 7311 | 728F |
| 12 | 76D5 | 7311 | 720F |
| 13 | 76D5 | 728F | 720F |
| 14 | 7311 | 728F | 720F |

FIG. 7C

| CLUSTER NUMBER | FAULTS | | | |
|---|---|---|---|---|
| 15 | 76D5 | 7311 | 728F | 720F |

| CLUSTER NUMBER | NTF | FAULTS |
|---|---|---|
| 1 | 102 | 7311 |
| 2 | 102 | 728F |
| 3 | 102 | 76D5 |
| 4 | 102 | 720F |
| 5 | 102 | 76D5 & 7311 |
| 6 | 102 | 76D5 & 728F |
| 7 | 102 | 76D5 & 720F |
| 8 | 102 | 7311 & 728F |
| 9 | 102 | 7311 & 720F |
| 10 | 102 | 728F & 720F |
| 11 | 102 | 76D5, 7311 & 728F |
| 12 | 102 | 76D5, 7311 & 720F |
| 13 | 102 | 76D5, 728F & 720F |
| 14 | 102 | 7311, 728F & 720F |
| 15 | 102 | 76D5, 7311, 728F & 720F |

METHOD AND APPARATUS FOR DIAGNOSING DIFFICULT TO DIAGNOSE FAULTS IN A COMPLEX SYSTEM

This application is a continuation of the application filed on Jul. 3, 2000, and assigned application Ser. No. 09/609,469, now U.S. Pat. No. 6,615,367, which claims the benefit of U.S. Provisional Application 60/162,045 filed on Oct. 28, 1999.

BACKGROUND OF THE INVENTION

The present invention relates generally to machine diagnostics, and more specifically to a system and method that improves diagnostic accuracy for failure conditions that are not possible to adequately diagnose and are therefore referred to as "no trouble found" conditions.

A machine, such as a locomotive or other complex system used in industrial processes, medical imaging, telecommunications, aerospace applications, and power generation may include controls and sensors for monitoring the various systems and subsystems of the machine and generating a fault indication when an anomalous operating condition occurs. Because the malfunction can impair the ability of the owner to conduct business efficiently and cost effectively, it is essential to accurately diagnose and quickly repair the machine.

Such complex machines may generate an error log, containing information describing the sequence of events that occurred during both routine operation and during any malfunction situation. The field engineer called to diagnose and repair the machine, will first consult the error log to assist with the diagnosis. The error log presents a "signature" of the machine's operation and can be used to identify and correlate specific malfunctions. Using her accumulated experiences at solving machine malfunctions, the field engineer reviews the error log to find symptoms that point to a specific fault and then repairs the machine to correct the problem. If the diagnosis was accurate, the repair will correct the machine malfunction. When the error log contains only a small amount of information, this manual process works fairly well. However, if the error log is voluminous (the usual case for large complex devices) and certain entries have an uncertain relationship or perhaps no relationship to a specific malfunction, it will be very difficult for the field engineer to accurately review and comprehend the information and successfully diagnose the fault.

To overcome the problems associated with evaluating large amounts of data in error logs, computer-based diagnostic expert systems have been developed and put to use. These diagnostic expert systems are developed by interviewing field engineers to determine how they proceed to diagnose and fix a machine malfunction. The interview results are then translated into rules and procedures that are stored in a repository, which forms either a rule base or a knowledge base. The rule or knowledge base works in conjunction with a rule interpreter or a knowledge processor to form the diagnostic expert system. In operation, based on information input by the technician, the rule interpreter or knowledge processor can quickly find needed information in the rule or knowledge base to evaluate the operation of the malfunctioning machine and provide guidance to the field engineer. One disadvantage associated with such conventional diagnostic expert systems is the limited scope of the rules or knowledge stored in the repository. The process of knowledge extraction from experts is time consuming, error prone and expensive. Finally, the rules are brittle and cannot be updated easily. To update the diagnostic expert system, the field engineers have to be frequently interviewed so that the rules and knowledge base can be reformulated.

Another class of diagnostic systems use artificial neural networks to correlate data to diagnose machine faults. An artificial neural network typically includes a number of input terminals, a layer of output nodes, and one or more "hidden" layer of nodes between the input and output nodes. Each node in each layer is connected to one or more nodes in the preceding and the following layer. The connections are via adjustable-weight links analogous to variable-coupling strength neurons. Before being placed in operation, the artificial neural network must be trained by iteratively adjusting the connection weights and offsets, using pairs of known input and output data, until the errors between the actual and known outputs, based on a consistent set of inputs, are acceptably small. A problem with using an artificial neural network for diagnosing machine malfunctions is that the neural network does not produce explicit fault correlations that can be verified by experts and adjusted if desired. In addition, the conventional steps of training an artificial neural network do not provide a measure of its effectiveness so that more data can be added if necessary. Also, the effectiveness of the neural network is limited and does not work well for a large number of variables.

Case-based reasoning diagnostic expert systems can also be used to diagnose faults associated with malfunctioning machines. Case-based diagnostic systems use a collection of data, known as historical cases, and compare it to a new set of data, a new case, to diagnose faults. In this context, a case refers to a problem/solution pair that represents the diagnosis of a problem and the identification of an appropriate repair (i.e., solution). Case-based reasoning (CBR) is based on the observation that experiential knowledge (i.e., knowledge of past experiences) can be applied to solving current problems or determining the cause of current faults. The case-based reasoning process relies relatively little on pre-processing of raw input information or knowledge, but focuses instead on indexing, retrieving, reusing, comparing and archiving cases. Case-based reasoning approaches assume that each case is described by a fixed, known number of descriptive attributes and use a corpus of fully valid cases against which new incoming cases can be matched for the determination of a root cause fault and the generation of a repair recommendation.

Commonly assigned U.S. Pat. No. 5,463,768 discloses an approach to fault identification using error log data from one or more malfunctioning machines using CBR. Each of the historical error logs contain data representative of events occurring within the malfunctioning machine. In particular, a plurality of historical error logs are grouped into case sets of common malfunctions. From the group of case sets, common patterns, i.e., identical consecutive rows or strings of error data (referred to as a block) are used for comparison with new error log data. In this comparison process, sections of data in the new error log that are common to sections of data in each of the case sets (the historical error logs) are identified. A predicting process then predicts which of the common sections of data in the historical error logs and the new error log are indicative of a particular malfunction. Unfortunately, for a continuous fault code stream, any or all possible faults may occur from zero times to an infinite number of times, and the faults may occur in any order, so the structure of the fault log data is not amenable to easy diagnosis. This feature of comparing error logs based on the sequence in which certain events occur represents a limitation on the process for determining the malfunction using historical error log data.

U.S. patent application Ser. No. 09/285,612 filed on Apr. 2, 1999 and entitled "Method and System for Processing Repair Data and Fault Log Data to Facilitate Diagnostics", assigned to the assignee of the present invention and herein incorporated by reference, discloses a system and method for processing historical repair data and historical fault log data, where this data is not restricted to sequential occurrences of fault log entries, as in the commonly owned patent described above. This system includes means for generating a plurality of cases from the repair data and the fault log data. Each case comprises a repair and a plurality of related and distinct faults. For each case, at least one repair and distinct fault cluster combination is generated and then a weight is assigned thereto. This weight value indicates the likelihood that the repair will resolve any of the faults included within the fault cluster. The weight is assigned by dividing the number of times the combination occurs in cases comprising related repairs by the number of times the combination occurs in all cases. New fault log data is entered into the system and compared with the plurality of fault log clusters. The repair associated with the matching fault log cluster represents a candidate repair to resolve that fault. The candidate repairs are listed in sequential order according to the calculated weight values.

Further, U.S. patent application Ser. No. 09/285,611, entitled "Method and System for Analyzing Fault Log Data for Diagnostics", assigned to the same assignee of the present invention and herein incorporated by reference, discloses a system and method for analyzing new fault log data from a malfunctioning machine, again where the system and method are not restricted to sequential occurrences of fault log entries. The fault log data is clustered based on related faults and then compared with historical fault clusters. Each historic fault cluster has associated with it a repair wherein the correlation between the fault cluster and the repair is indicated by a repair weight. Upon locating a match between the current fault clusters and one or more of the historical fault clusters, a repair action is identified for the current fault cluster based on the repair associated with the matching historical fault cluster.

One particular type of fault situation that can be advantageously analyzed by certain fault analysis and diagnostic tools involves so-called "no trouble found" faults. Failure conditions that are difficult to diagnose within a complex system may result in such a declaration of no trouble found. The system experiences intermittent failures and once it is taken out of service and the repair process initiated, there is no evidence of a fault or failure. Generally this is occasioned by the intermittent nature of the fault or because the complexity of the system obscures the fault condition to a repair technician whose skills may be deficient in some area relevant to the system. In some situations, repair personnel may be unable to recreate the fault at the maintenance center. In each of these situations, the repair technician declares that the system is failure free and ready for return to service. Later, the system may experience a repeat failure due to the same problem, requiring another attempt at diagnosis and repair.

In the operation of a railroad, if a fault condition occurs while a locomotive is in service, the operator may elect to stop the train and attempt a repair with assistance from service personnel contacted by phone. In those cases where the operator cannot repair the fault, he will continue on his route until he arrives at a site where the locomotive can be diagnosed and repaired. If the locomotive is incapable of further operation, it is removed from service and towed to a repair site. Typically, the fault can be identified and repaired and the locomotive returned to service. In the event that the repair technician is unable to properly diagnose the fault condition, e.g., the fault condition no longer exists at the time the repair technician conducts his analysis, then the fault will be declared a no trouble found event.

Railroad operations usually require that all significant anomalous conditions on the locomotive must be analyzed and then closed out by the repair technician, including no trouble found events. In those situations where the diagnosis identifies a specific faulty part and a repair is accomplished, certain railroad repair codes are used to designate the problem and close it, after which the locomotive is returned to service. Due to the complexity of a railroad locomotive and the occasional inability to identify a specific fault condition, many "faults" are simply closed as "no trouble found". Further, and disadvantageously, the inability to identify the root cause of the locomotive problem may result in the problem status remaining in an open condition for an extended period of time. This is detrimental to efficient operation of the railroad, as the operator would like to identify, diagnose and close faults as early and as efficiently as possible.

A further complication to the diagnosis and repair problem may be due to the site where the diagnosis and repair is first attempted. There are at least three different sites where a locomotive can undergo repairs, including on a run-through track where certain simple processes can be executed, on a service track where the locomotive is isolated from the main line and more complex and lengthy repairs can be undertaken, and at a main shop where the locomotive can be disassembled to diagnose problems and conduct repairs. Because the most complex repairs are undertaken at the main shop, the skill set of the technicians there tends to be higher than the ability of those technicians who are stationed at a run-through site. As a result, certain locomotive faults are incapable of being detected and thoroughly analyzed, dependent upon the site where the analysis takes place, again leading to a proliferation of "no trouble found" situations.

It is believed that the fault and repair analysis tools disclosed in the patent applications described above provide substantial advantages and advancements in the art of the diagnostics of complex machines. It would be desirable, however, to provide a system and method to improve the evaluation and identification of faults in those cases where heretofore a "no trouble found" designation was assigned. As a result, the diagnostic accuracy is improved and the number of no trouble found events that occur in fielded systems is reduced. Ultimately, reduction in the number of no trouble found conditions represents a cost savings to the system user due to fewer repeat failures and lower trouble shooting costs.

BRIEF SUMMARY OF THE INVENTION

Generally speaking, the present invention fulfills the foregoing needs by providing a method and system for analyzing fault log data and repair records to correlate no trouble found events with the prior fault logs and data to identify fault patterns and root causes. If certain fault patterns are evident from this analysis of no trouble found events, then trouble shooting methods to resolve these fault patterns must be developed. Developing these trouble shooting patterns may involve consultations with an expert to identify the nature of what had previously been identified as no trouble found events. Alternatively, other expert systems or case-based reasoning tools are available for determining the specific underlying fault.

Once the formerly no trouble found events have been analyzed and the underlying cause detected, this information can be loaded into an expert system, case-based reasoning tool, or other diagnostic processing tool. Now, when fault log information and operational parameters are received from a machine, the diagnostic tool is more likely to identify a specific cause, thus avoiding the declaration of a no trouble found situation, which was so prevalent in the prior art.

BRIEF DESCRIPTION OF THE DRAWINGS

The features and advantages of the present invention will become apparent from the following detailed description of the invention when read together with the accompanying drawings in which.

DETAILED DESCRIPTION OF THE PREFERRED EMBODIMENTS

Figure 1:
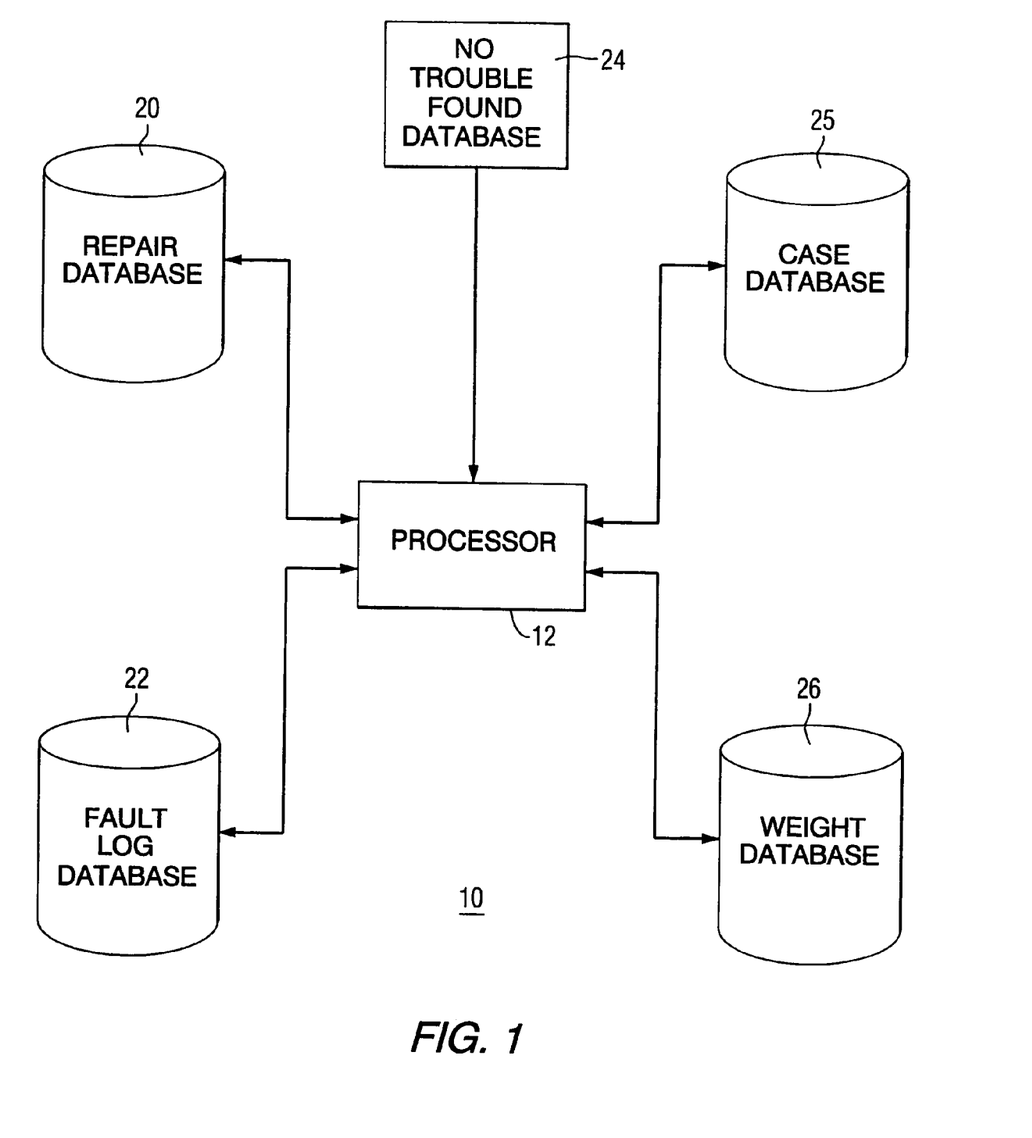
FIG. 1 is a block diagram of one embodiment of a system of the present invention using a processor for processing operation parametric data and fault log data from one or more machines and diagnosing a malfunctioning machine.

FIG. 1 diagrammatically illustrates one embodiment of the diagnostic system 10 of the present invention for analyzing no trouble found events to identify fault patterns and correlations of these patterns with certain faults. The diagnostic system 10 provides a process for automatically harvesting or mining repair data describing related and unrelated repairs and fault log data from one or more machines, such as locomotives. The diagnostic system 10 generates weighted repair and distinct fault cluster combinations that are diagnostically significant predictors of the repair action that will resolve a newly identified fault in a malfunctioning machine, including a no trouble found event. Thus, the historical data facilitate later analysis of new fault log data from a malfunctioning locomotive. In one embodiment of the invention, the diagnostic system 10 can jointly analyze the fault log and data operational parameters from the malfunctioning locomotive.

Although the present invention is described with reference to a locomotive, the diagnostic system 10 can be used in conjunction with any machine where the operational parameters of the machine are monitored. Exemplary applications include medical diagnostic equipment, telecommunications systems, and jet engines.

The exemplary diagnostic system 10 illustrated in FIG. 1 includes a processor 12 such as a computer (e.g., a UNIX workstation) having a hard drive, input devices such as a keyboard or a mouse, magnetic storage media (e.g., tape cartridges or disks), optical storage media (e.g., CD-ROM's), and output devices such as a display and a printer. The processor 12 is connected to and processes data contained in a repair database 20 and a fault log database 22. As will be discussed further herein below, the processor 12 is also responsive to fault log and operational parametric information related to no trouble found events, as illustrated by a reference character 24.

Figure 2:
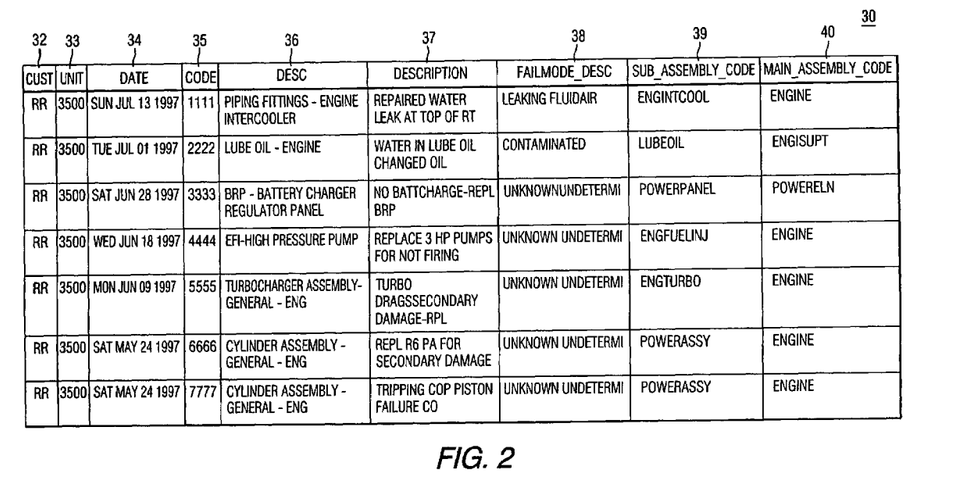
FIG. 2 is an illustration of exemplary repair log data.

The repair database 20 includes repair data or records related to a plurality of related and unrelated repairs for one or more locomotives. FIG. 2 shows an exemplary portion 30 of the repair data contained in the repair data database 20. The repair data includes a customer identifier in a column 32, a locomotive identification or locomotive road number in a column 33, the repair date in a column 34, a repair code in a column 35, a prose description of the repair code in a column 36, a description of the actual repair performed in a column 37, a description of the failure mode in a column 38, the sub-assembly to which the repair relates in a column 39, and the primary system to which the repair relates in a column 40.

Figure 3:
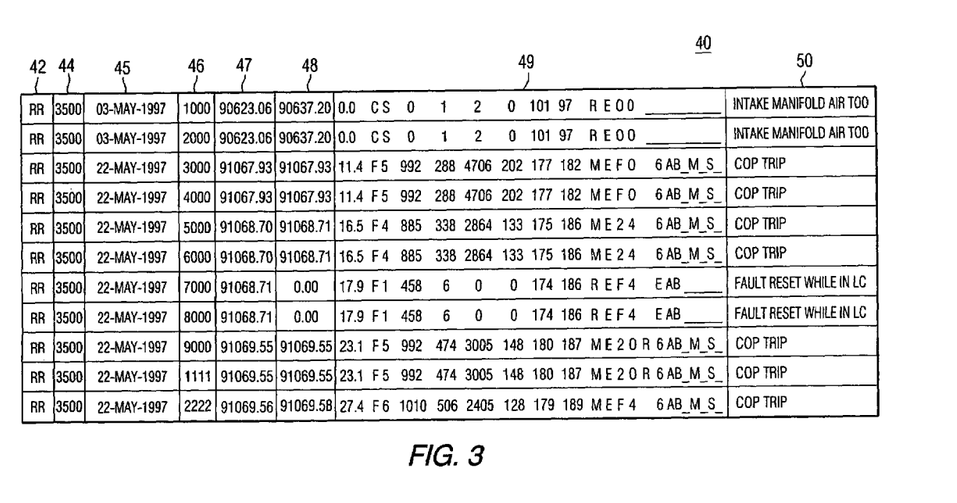
FIG. 3 is an illustration of exemplary fault log data.

The fault log database 22 includes fault log data or records regarding a plurality of faults (occurring prior to the repair) for one or more locomotives. FIG. 3 shows an exemplary portion 40 of the fault log data stored in the fault log database 22. The fault log data includes a customer identifier in a column 42, a locomotive identifier or road number in a column 44, the date that the fault occurred in a column 45, a fault code in a column 46, and a prose description of the fault code in a column 50. The fault occurrence time is given in a column 47 and the fault reset time is shown in a column 48. The occurrence and reset times are represented by the number of equal time increments from a predetermined start time. The count values are converted to eastern standard (or daylight) time via a decoder program, the operation of which is well known in the art. The process of resetting a fault involves recognizing its occurrence and then resetting the system for continued operation. Minor faults are automatically reset, whereas more significant faults require manual resetting by a technician or the locomotive operator. These faults must be manually reset to ensure that the locomotive operator or technician has been made aware of the fault and determined that continued locomotive operation is acceptable. Additional information in the form of operating parametric values is shown in the fault log 40 within that area designated by a reference character 49. This operational information may include temperature sensor readings, pressure sensor readings, electrical voltage and current readings, and power output readings. Operational states may also be shown within the area designated by the reference character 49. Such operational states include whether the locomotive is in a motoring or a dynamic braking mode, whether any particular subsystem within the locomotive is undergoing a self test, whether the locomotive is stationary, and whether the engine is operating under maximum load conditions. One or more of these operating parameters or states may provide important clues to diagnosing a fault.

The diagnostic system 10 also includes the no trouble found database 24 for storing fault information related to those events that could not be properly analyzed and were therefore designated as no trouble found events. The entries in the no trouble found database are similar to the fault log records, as illustrated in FIG. 3. But, the entries in the no trouble found database represent those events for which there has yet been no identification of the root cause or resolution.

Figure 4:
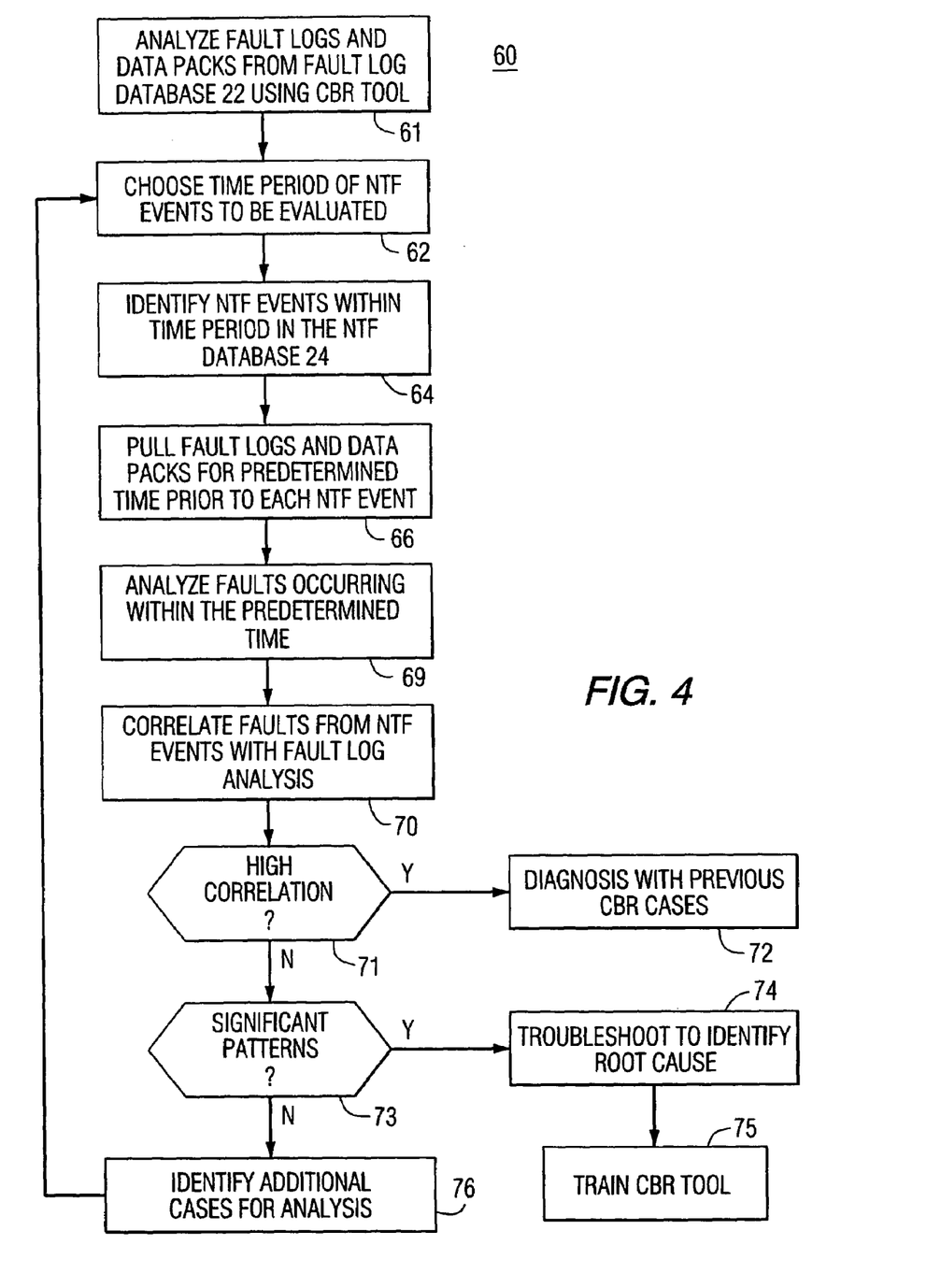
FIGS. 4 and 5 are flowcharts illustrating operation of certain aspects of the present invention.

FIG. 4 is a flow chart of an exemplary process 60 of the present invention for identifying significant fault patterns in no trouble found (NTF) events. The objective of this analysis is the development of a statistical database that can be used later in the process to find a correlation between faults occurring on locomotives and no trouble found events. For instance, the case-based reasoning tool may determine that fault ABC has a 60 percent probability of occurring, within a predetermined time interval prior to the later occurrence of an NTF event, and fault DEF occurs (within the same predetermined time interval) in 10 percent of the situations prior to the occurrence of that same NTF event. Thus, the high correlation indicates a likely connection between fault ABC and the NTF fault, but there is little likelihood that fault DEF is related to the NTF event.

At a step 61, the fault logs and the associated data packs from a plurality of locomotives are analyzed using the case-based reasoning tool, as will be discussed further herein below. The results of this analysis establish a database of faults against which NTF events will later be compared. At a step 62, a time period during which the NTF faults are to be evaluated is chosen. At a step 64, those no trouble found events occurring within the selected time period are downloaded from the no trouble found database 24, for a specific locomotive. As is known by those skilled in the art, the information stored within the no trouble found database 24 can be created by the railroad maintenance personnel or by third party locomotive repair experts who provide diagnostic and repair services to a railroad. In any case, this database includes details associated with those occurrences that could not be diagnosed and have therefore, been designated as no trouble found events. At a step 66, fault logs and data packs (where the data packs are the parametric operational information shown within the region 49 of FIG. 3) for a predetermined time prior to each NTF event selected at the step 64 are downloaded from the fault log database 22 for the specific locomotive of interest. At a step 69, the faults are analyzed, using a process to be discussed further herein below in conjunction with FIG. 8, to identify their root cause. At a step 70, the NTF events are correlated with the diagnosed faults in an attempt to identify the problem that may be the root cause of a no trouble found event. Specifically, each NTF event is correlated with the fault clusters generated at the step 61 to identify those matches having the highest correlation values. Recall that each fault cluster is associated with a repair, and a weighting value identifies the likelihood that the specific repair will correct the faults in the cluster. Once a high correlation is identified between an NTF event and an actual fault, the repair action associated with the actual fault is then implicitly correlated with the NTF event. This repair will most likely (to the extent of the weighted value) correct the NTF fault.

At a decision step 71, the correlation values are checked in search of high correlations. The selection of a threshold above which a correlation is designated as "significant" must be accomplished experimentally and is dependent upon several different parameters including: the number of no trouble found events, the nature and extent of the prior knowledge as stored in the repair database 20 and the fault log database 22, the sophistication of the case-based reasoning tool and the particular factors that go into designating a particular failure as a no trouble found event.

If significant (i.e., high correlation) fault patterns are identified at the decision step 71, processing moves to a step 72, which indicates that the previous cases already stored within the CBR tool can diagnose the NTF event and determine the root cause. Identification of the root cause will serve to decrease the number of NTF event, as the repair technician will now have insight into the cause of what had previously been classified as an NTF event. If high correlations are not identified at the decision step 71, processing moves to a decision step 73 where the process 60 searches for significant patterns, between the occurrence of actual faults and NTF events. If any such patterns are found, processing moves to a step 74, indicating that the NTF event data must be studied in an attempt to identify the root cause. This study is undertaken off-line by locomotive repair experts.

After determination of the root cause by locomotive experts (as represented by the step 74), it is advantageous to train the case-based reasoning tool to watch for these specific patterns of faults. This training process is indicated by a step 75. In this way, the next time the case-based reasoning tool is presented with the fault pattern deemed significant at the step 73, it will identify the root cause and suggest a recommended repair. Thus the process 60 will reduce the number of NTF events because previously identified NTF events will now have a root cause and repair recommendation based on the output from the case-based reasoning tool as implemented by the process 60. Thus the case-based reasoning tool has "learned" a new piece of data such that when new faults are entered it will correlate the new faults with previous faults and provide an appropriate root cause and recommended repair.

If no significant patterns are identified, processing moves to a step 76, which indicates that additional NTF cases can be retrieved for analysis. Specifically, this is accomplished by returning to the step 62 and choosing a different time period for the NTF faults to be evaluated.

Figure 5:
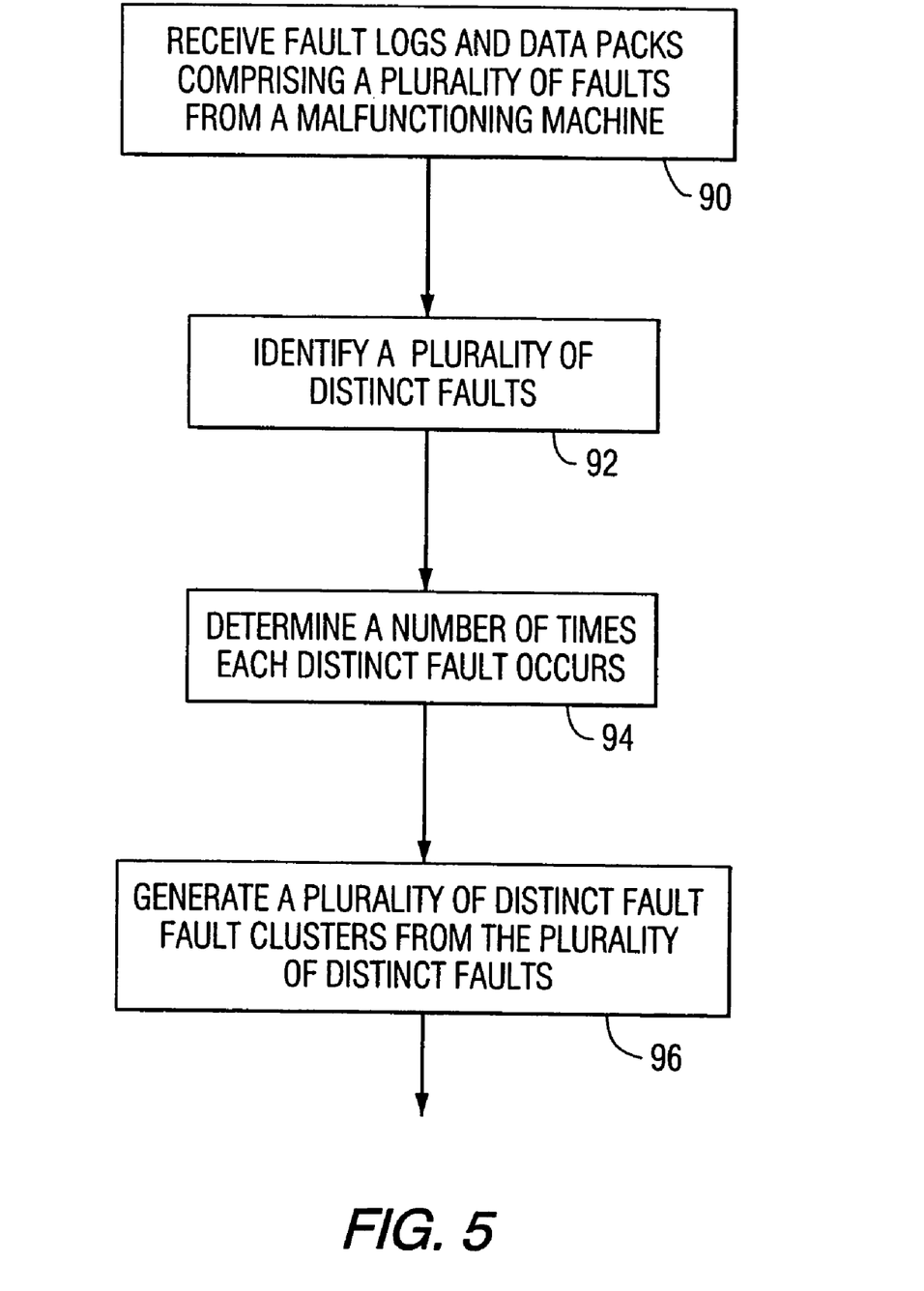

FIG. 5 is a flow chart generally describing the steps carried out during the analysis of the fault logs and data packs shown at the step 61 of FIG. 4. At a step 90, the fault logs and data packs related to the NTF events are received. At a step 92, faults are segregated into a plurality of distinct faults. At a step 94, the number of occurrences for each of these distinct faults is determined. As used herein, the term "distinct fault" is a fault (as identified by a fault code) that differs from other faults (or fault codes) so that, as described in greater detail below, if a portion of the fault log data includes more than one occurrence of the same fault, the fault is identified only once. It is the selection of the distinct faults that is important, and not the order or sequence of their arrangement or occurrence in the fault log.

Figure 6:
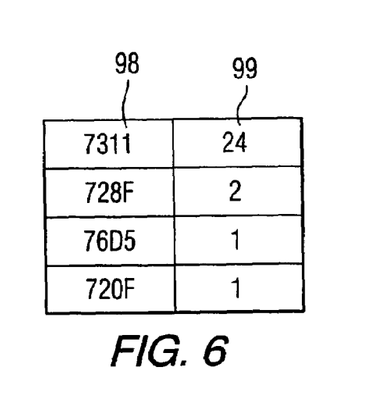
FIGS. 6 and 7 illustrate exemplary fault clusters.

FIG. 6 shows four distinct faults (7311, 728F, 76D5, and 720F) in a column 98, and in a column 99 the number of times each distinct fault occurred within the fault logs pulled at the step 66 of FIG. 4. In this example, fault code 7311 represents a phase module malfunction that occurred 24 times. Fault code 728F indicates an inverter propulsion malfunction occurring twice. Fault code 76D5 occurred once and indicates a fault reset. Finally, fault code 720F indicates an inverter propulsion malfunction; this fault occurred once.

Figure 7A:
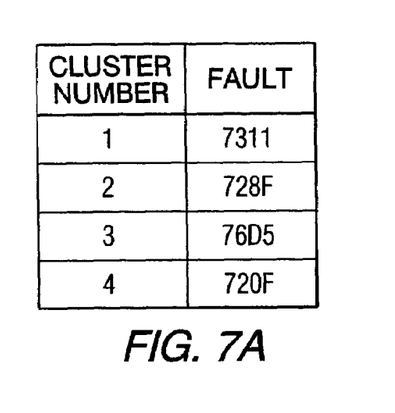
Figure 7B:
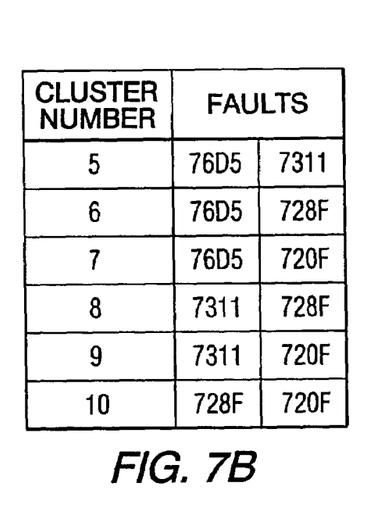
Figure 7C:
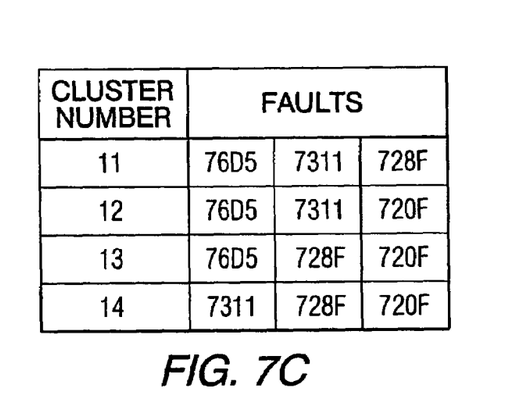
Figure 7D:
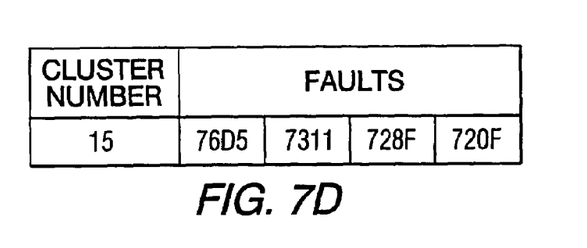

Returning to FIG. 5, a plurality of fault clusters are generated for the distinct faults at a step 96. These fault clusters are illustrated in FIGS. 7A, 7B, 7C, and 7D. Four single fault clusters (each fault cluster comprising one fault) are illustrated in FIG. 7A. FIG. 7B illustrates six unique double fault clusters (each cluster having two faults). Four triple fault clusters are shown in FIG. 7C. FIG. 7D illustrates one quadruple cluster (i.e., one cluster having four faults). From this series of examples, it will be appreciated by those skilled in the art that a fault log domain having a greater number of distinct faults results in a greater number of distinct fault clusters. It is these fault clusters that are correlated with the NTF events at the step 70 of FIG. 4.

Figure 8:
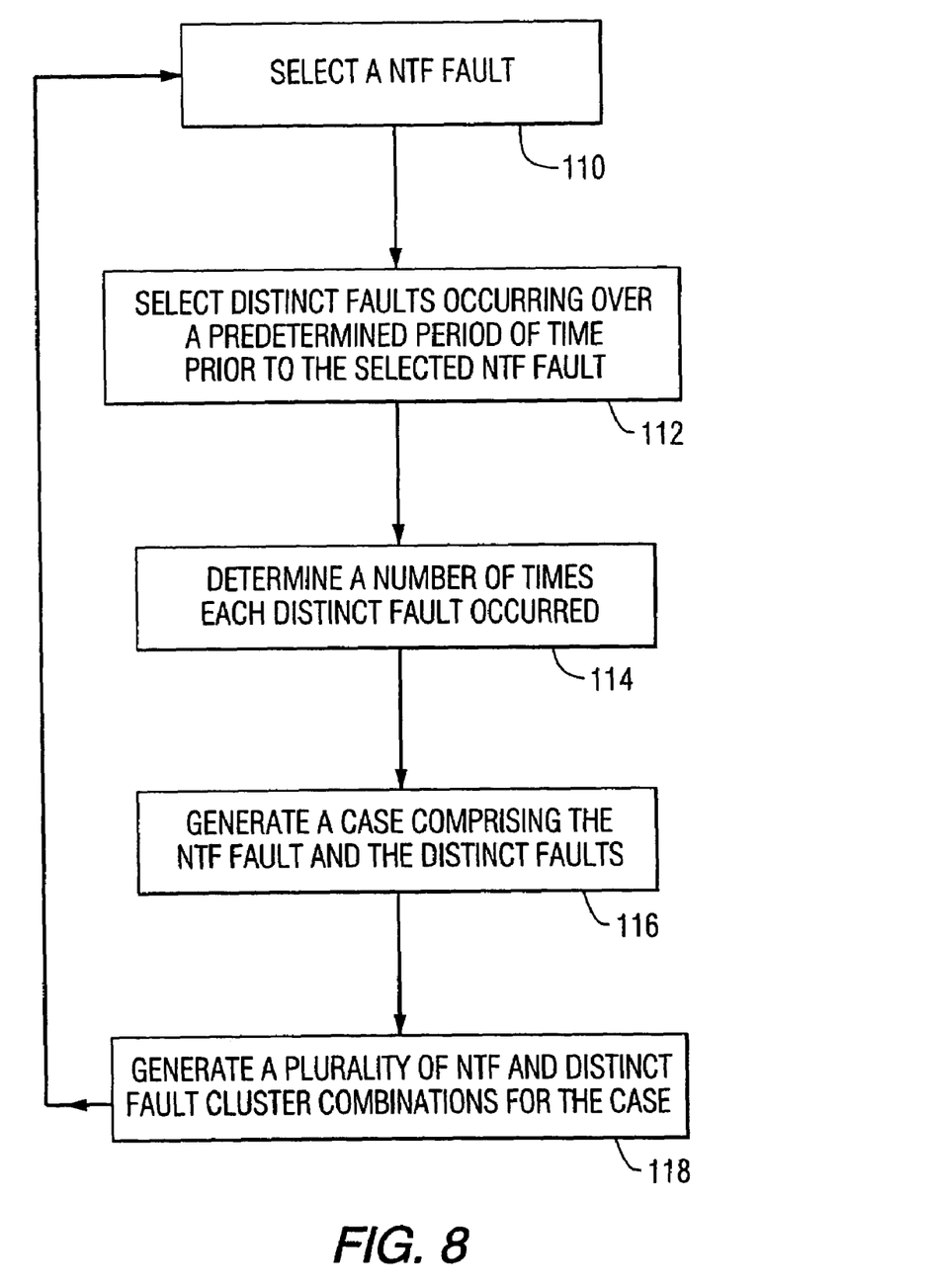
FIG. 8 is a flowchart depicting operation of certain features of the present invention.

The flow chart of FIG. 8 illustrates the process of analyzing NTF-related fault logs and data packs using the case-based reasoning tool, as was shown generally at the step 69 in FIG. 4. At a step 110, a specific NTF event is selected. Recall that at the step 66 of FIG. 4, the process 60 pulled all fault logs for a predetermined time prior to each NTF event. Now that a single NTF fault has been selected, the FIG. 8 process analyzes only those fault logs and data packs occurring within a predetermined time prior to the selected NTF event. This process is accomplished at a step 112 of FIG. 8. At a step 114, the number of occurrences of each distinct fault is determined. At a step 116, the selected no trouble found event and the distinct faults selected at the step 112 are stored as a case. An example of an NTF fault and the distinct faults occurring within the predetermined period of time prior thereto is shown in Table 1.

NTF Event 102

Faults Occurring within Predetermined Time of NTF Event 102

TABLE 1

| Fault | Number of Occurrences |
|---|---|
| 7311 | 12 |
| 728F | 3 |
| 76D5 | 4 |
| 720F | 1 |

Figure 9:
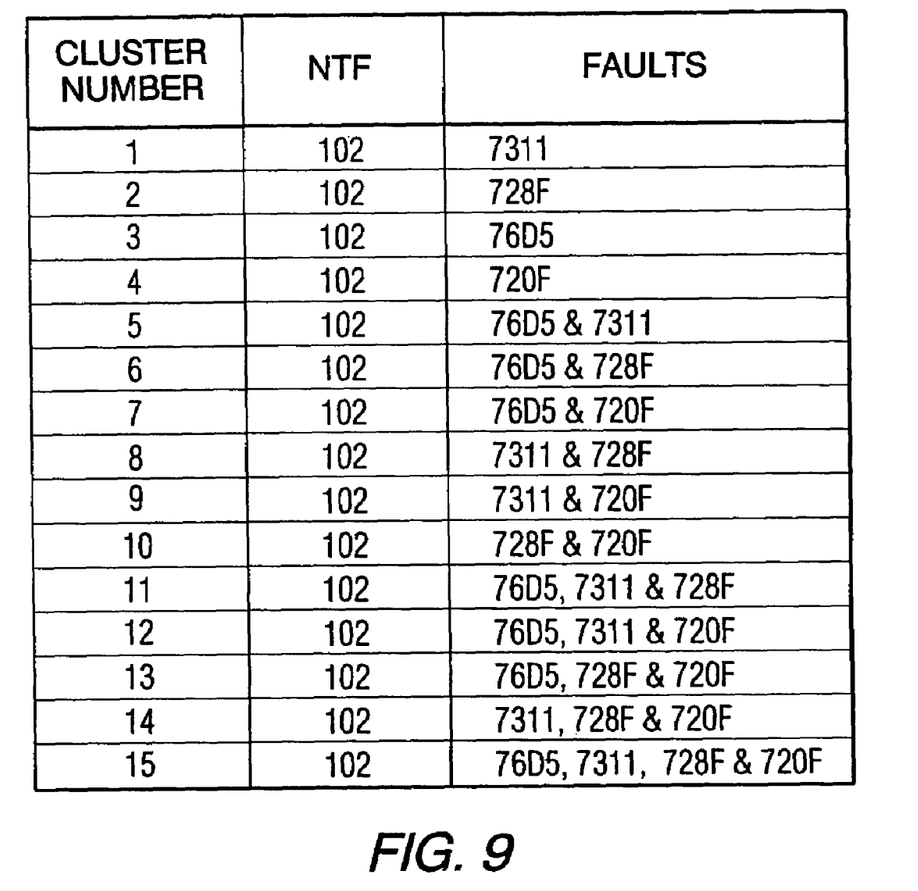
FIG. 9 is a table of no trouble found events and fault clusters.

At a step 118, a plurality of repair and distinct fault cluster combinations are generated for the case created at the step 116. If, for instance there are four distinct faults from the step 112, then 15 fault clusters are generated therefrom. FIG. 9 lists the fault elements in each of the 15 clusters, all of which are related to a specific no trouble found event, designated as NTF event 102.

The FIG. 8 process is repeated by selecting another no trouble found event entry from the no trouble found database 24 and generating another plurality of fault cluster combinations. All the fault cluster combinations for each no trouble found event are stored in a case database 25 shown in FIG. 1. The stored information has the format shown in FIG. 9.

Figure 10:
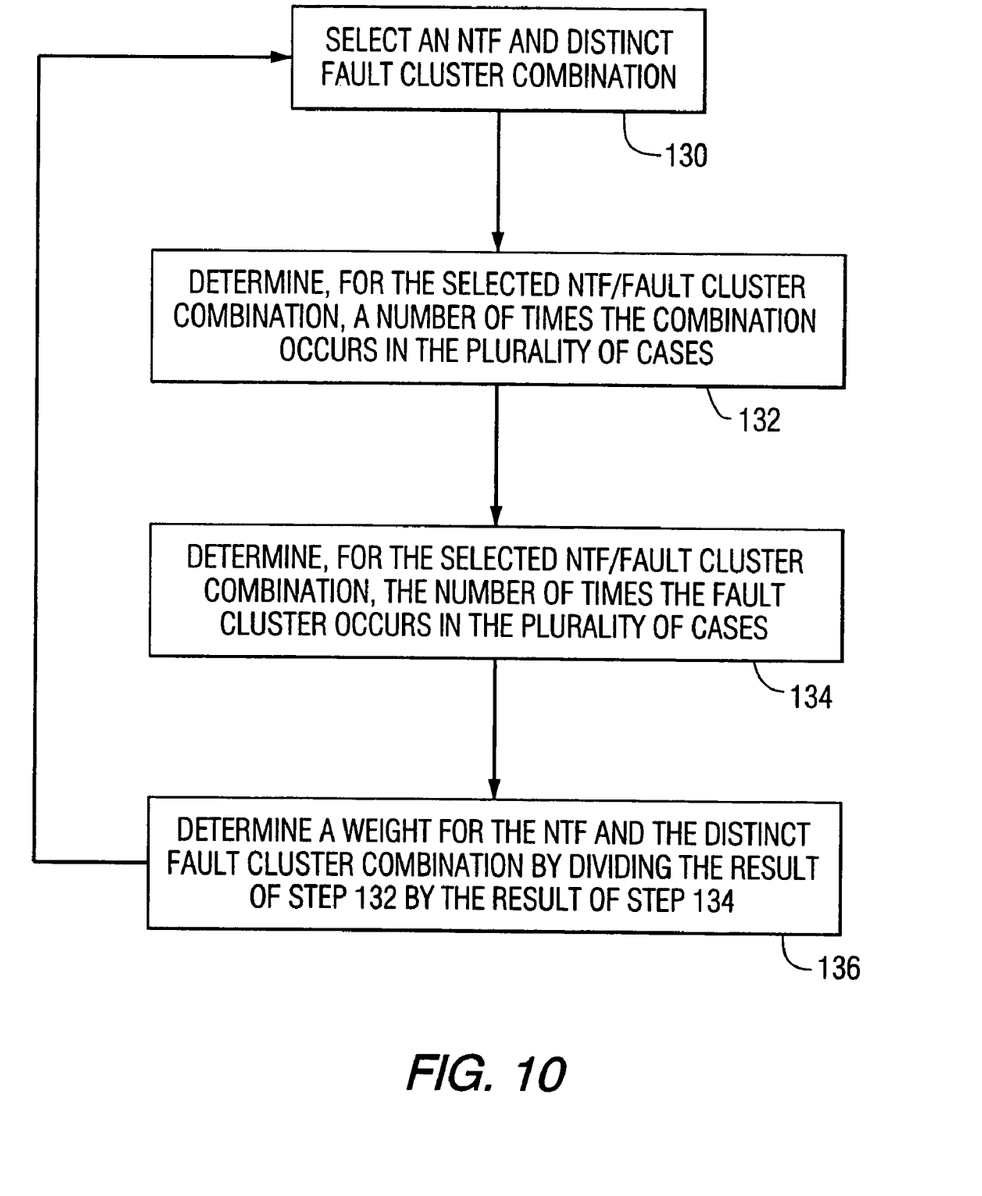
FIG. 10 is a flow chart illustrating the analysis of no trouble found events and fault clusters.

FIG. 10 is an exemplary process of the present invention for generating weighted NTF and fault cluster combinations based on the plurality of cases generated in the flow chart of FIG. 8. The FIG. 10 process begins at a step 130 where the combination of a specific NTF event and a distinct fault cluster is selected from among the cluster/NTF combinations shown in FIG. 9 and stored in the case database 25. Recognize that FIG. 9 shows fault cluster combinations associated with a single NTF event; the case database 25 stores fault clusters associated with a plurality of NTF events. At a step 132, the number of times the fault cluster occurs in association with a specific NTF event is determined. At a step 134, the number of times the fault cluster occurs, whether or not associated with this or any NTF event, is determined. A weight is determined at a step 136 for the NTF/fault cluster combination by dividing the number of times the specific NTF event/fault cluster combination occurs (as determined at the step 132) by the number of times the combination occurs in all cases (as determined at the step 134). The calculated weight is stored in a weight database 26 of FIG. 1.

The processes illustrated in FIGS. 8 and 10 are described in greater detail in commonly owned patent application, application Ser. No. 09/285,612, filed on Apr. 2, 1999, entitled "method and System for Processing Repair Data and Fault Log Data to Facilitate Diagnostics" (Attorney Docket Number RD-26,576), the subject matter of which is hereby incorporated by reference in its entirety.

The weight values calculated in the step 136 of FIG. 10 are used at the decision step 71 of FIG. 4 to determine whether there is a significant correlation between fault information stored in the CBR tool and the selected no trouble found faults. That is, the higher the weight value, the more likely that the fault pattern generating that weight value correlates highly with the specific no trouble found fault.

Tables 2 and 3 below illustrate the process carried out in FIGS. 8 and 10. Two different NTF events are identified in Table 2, bearing NTF event numbers 102 and 103. Each NTF event was correlated with a number of actual faults. In the case of NTF event 102, it correlates to a value of 0.7 with actual fault 7487, to a value of 0.2 with actual fault 3219 and to a value of 0.1 with actual fault 4611. Similar data is shown for NTF event 103. Table 2 therefore suggests that NTF event 102 may in fact be related to actual fault 7487 and NTF fault 103 may, but to a lesser probability, be related to actual fault 7453. The potential repair codes associated with actual fault 7487 are shown in Table 3. Note that repair code 1112 correlates highly with actual fault 7487. The result of this analysis suggests that NTF fault 102 may be caused by actual fault 7487, which may be resolved by implementing repair code 1112.

TABLE 2

| NTF Event | Actual Fault | Weight |
|---|---|---|
| 102 | 7487 | .7 |
|  | 3219 | .2 |
|  | 4611 | .1 |
| 103 | 7453 | .5 |
|  | 4521 | .3 |
|  | 3612 | .2 |
|  | 3712 | .1 |

TABLE 3

| Actual Fault | Repair Code | Weight |
|---|---|---|
| 7487 | 1112 | .7 |
| 7487 | 1321 | .1 |
| 7487 | 1761 | .1 |

The case-based reasoning tool embodied in the processes described in FIGS. 8 and 10 is also used to correlate specific repairs with fault clusters, in much the same way as the NTF events are correlated with fault clusters as discussed herein. Therefore, the case-based reasoning tool can be used to determine both the root cause and the recommended repair for fault clusters correlated with NTF events; as described herein.

In lieu of using the CBR for this purpose, locomotive repair experts and other diagnostic tools can be used to perform this analysis. This is in fact the exercise to be undertaken at the step 74 in FIG. 4. Whether this analysis is conducted by using a case-based reasoning tool, other tools, or experts in the field, when the probable root cause is identified, this information is incorporated back into the case-based reasoning tool, (i.e., at the step 75 of FIG. 4).

Then, when no trouble found events occur later, they can be processed through the case-based reasoning tool, which will have correlated certain of those NTF events with recommended repair actions. In this way, the number of no trouble found events identified by the railroad can be measurably reduced. If the recommended repairs are implemented, then the locomotive road failures will also be reduced.

While the invention has been described with reference to a preferred embodiment, it will be understood by those skilled in the art that various changes may be made and equivalent elements may be substituted for elements thereof without departing from the scope of the present invention. In addition, modifications may be made to adapt a particular situation more material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining one or more faults causing a no trouble found event in a locomotive wherein no cause has been determined for the no trouble found event, the method comprising:
   (a) selecting a no trouble found event that occurred on the locomotive;
   (b) determining faults occurring on the locomotive within a predetermined time interval prior to the no trouble found event;
   (c) determining correlations between faults determined at step (b) and the no trouble found event; and
   (d) selecting at least one fault with a relatively high correlation from step (c).

2. The method of claim 1 wherein a locomotive repair is associated with each fault, the method further comprising:
   (e) implementing the repair associated with the selected fault on the locomotive.

3. The method of claim 1 wherein a plurality of locomotive repairs are associated with each fault, with each repair of the plurality of repairs having a weight value indicative of the probability that the repair will resolve the fault, the method further comprising:
   (e) selecting at least one repair having a relatively large weight value from the plurality of repairs; and
   (f) implementing the repair selected at step (e) on the locomotive.

4. The method of claim 1 wherein the step (c) further comprises analyzing locomotive operational data and operational data associated with each of the faults.

5. The method of claim 1 wherein the selected fault has the highest probability of causing the no trouble found event.

6. The method of claim 1 wherein the selected fault is indicative of a root cause for the no trouble found event.

7. The method of claim 1 wherein step (c) further comprises:
   (c1) forming a plurality of fault clusters from the determined faults, wherein each one of the plurality of fault clusters comprises at least one of the determined faults and the plurality of fault clusters comprises unique combinations of the determined faults;
   (c2) linking the no trouble found event with each one of the plurality of fault clusters to form a like plurality of no trouble found event/fault cluster combinations;
   (c3) determining a number of occurrences of each one of the plurality of no trouble found event/fault cluster combinations in a data base comprising historical no trouble found event/fault cluster combinations;
   (c4) determining a number of occurrences of each one of the plurality of fault clusters in a data base comprising historical fault clusters; and
   (c5) determining a correlation for each one of the plurality of no trouble found event/fault cluster combinations.

8. The method of claim 7 wherein the step (c5) comprises dividing the number of occurrences from the step (c3) by the number of occurrences from the step (c4).

9. The method of claim 7 wherein the step (d) further comprises:
   (d) selecting the no trouble found event/fault cluster combination having a relatively high correlation.

10. The method of claim 9 wherein each one of the plurality of fault clusters is associated with a locomotive repair, the method further comprising:
    (e) implementing the repair associated with the fault cluster of the selected no trouble found event/fault cluster combination.

11. The method of claim 7 wherein the data base comprising historical no trouble found event/fault cluster combinations comprises no trouble found event/fault cluster combinations from a plurality of locomotives.

12. The method of claim 7 wherein the data base comprising historical fault clusters comprises fault clusters from a plurality of locomotives.

13. The method of claim 1 wherein the step (d) further comprises:
    (d1) determining whether the correlation of the fault selected in step (c) exceeds a predetermined threshold;
    (d2) if said correlation does not exceed the threshold, returning to the step (b) for determining faults occurring on the locomotive within an extended time interval prior to the no trouble found event, wherein the extended time interval is longer than the predetermined time interval; and
    (d3) if said correlation exceeds the threshold, selecting a fault with the corresponding correlation.

14. The method of claim 1 wherein the step (d) further comprises:
    (d1) determining whether the correlation of the fault selected in step (c) exceeds a predetermined threshold;
    (d2) if the said correlation does not exceed the threshold, engaging a locomotive repair expert to analyze the no trouble found event and the faults occurring within a predetermined time prior to the no trouble found event; and
    (d3) if the highest correlation exceeds the threshold, selecting a fault with the highest correlation.

15. The method of claim 1 wherein a locomotive repair is associated with each fault, the method further comprising:
    (e) implementing the repair associated with the selected fault on the locomotive;
    (f) determining whether the implemented repair resolves the no trouble found event; and
    (g) if the implemented repair resolves the no trouble found event, associating the no trouble found event with the implemented repair for use in determining the one or more faults that cause a future no trouble found event.

16. An article of manufacture comprising a computer program product comprising a computer-usable medium having computer-readable code therein for determining one or more faults causing a no trouble found event in a locomotive, wherein the no trouble found event comprises a locomotive fault for which no cause has been determined, the article of manufacture comprising:
- (a) a computer-readable program code module for selecting a no trouble found event that occurred on the locomotive;
- (b) a computer-readable program code module for determining faults occurring on the locomotive within a predetermined time interval prior to the no trouble found event;
- (c) a computer-readable program code module for determining correlations between faults determined at step (b) above and the no trouble found event; and
- (d) a computer-readable program code module for selecting at least one fault with a relatively high correlation from step (c).

* * * * *